United States Patent
Shimanouchi et al.

(10) Patent No.: US 8,218,285 B2
(45) Date of Patent: Jul. 10, 2012

(54) VARIABLE CAPACITANCE ELEMENT

(75) Inventors: Takeaki Shimanouchi, Kawasaki (JP); Masahiko Imai, Kawasaki (JP); Satoshi Ueda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 12/723,767

(22) Filed: Mar. 15, 2010

(65) Prior Publication Data
US 2010/0254068 A1  Oct. 7, 2010

(30) Foreign Application Priority Data
Apr. 6, 2009  (JP) .................. 2009-092174

(51) Int. Cl.
*H01G 5/00* (2006.01)

(52) U.S. Cl. ........ 361/278; 361/272; 361/273; 361/277; 361/281; 361/290

(58) Field of Classification Search ............. 361/278, 361/281, 283.3, 290–292, 272–273, 277, 361/279, 283.1
See application file for complete search history.

(56) References Cited

U.S. PATENT DOCUMENTS

| | | | |
|---|---|---|---|
| 6,853,476 B2 * | 2/2005 | Martin et al. ............. | 359/290 |
| 7,027,284 B2 * | 4/2006 | Kobayashi et al. ......... | 361/278 |
| 7,177,134 B2 * | 2/2007 | Ikehashi et al. ........... | 361/278 |
| 7,489,004 B2 * | 2/2009 | Combi et al. ............. | 257/312 |
| 7,751,173 B2 * | 7/2010 | Ikehashi et al. ........... | 361/271 |
| 2005/0248423 A1 | 11/2005 | Qian et al. | |
| 2006/0209491 A1 | 9/2006 | Ikehashi et al. | |

FOREIGN PATENT DOCUMENTS
JP  2005-340536 A  12/2005
JP  2006-261480 A  9/2006

OTHER PUBLICATIONS
Chinese Office Action dated May 12, 2011, issued in corresponding Chinese Patent Application No. 201010124349.8.

* cited by examiner

*Primary Examiner* — Nguyen T Ha
(74) *Attorney, Agent, or Firm* — Fujitsu Patent Center

(57) ABSTRACT

A variable capacitance element provided with a substrate, a signal line provided on the substrate, a fixed electrode provided on the substrate, and a movable electrode. The movable electrode includes a movable portion that spans the signal line and extends to above the fixed electrode, and is movable with respect to the fixed electrode, and a fixed portion that is fixed to the fixed electrode across a dielectric layer.

10 Claims, 14 Drawing Sheets

VARIABLE CAPACITANCE ELEMENT

CROSS-REFERENCE TO RELATED APPLICATION

This application is based upon and claims the benefit of priority of the prior Japanese Patent Application No. 2009-092174, filed on Apr. 6, 2009, the entire contents of which are incorporated herein by reference.

FIELD

The present invention relates to a variable capacitance element used in, for example, an electrical circuit of a communication device or the like.

BACKGROUND

A variable capacitance element is an important component used in, for example, electrical circuits including variable frequency oscillators, tuned amplifiers, phase shifters, impedance matching circuits, and the like. In recent years, there has been an increase in the mounting of variable capacitance elements to mobile devices. Variable capacitance elements manufactured using MEMS technology have the advantage of being able to increase the Q value due to having a low loss, compared with varactor diodes that have mainly been used heretofore. For this reason, development of these variable capacitance elements is being pushed ahead.

Variable capacitance elements are commonly configured to change capacitance by changing the distance between two opposing electrodes (e.g., see Patent Document 1). FIGS. 1A and 1B depict the configuration of a conventional variable capacitance element. A fixed electrode 43 is provided on a substrate 41, and a movable electrode 45 is supported in a position opposing the fixed electrode 43. The movable electrode 45 is movable with respect to the fixed electrode 43 because of having elasticity. The distance between the movable electrode 45 and the fixed electrode 43 changes as a result of electrostatic attraction produced by applying a voltage between the fixed electrode 43 and the movable electrode 45. Electrostatic capacitance thereby changes. Also, a dielectric layer 49 is installed between the fixed electrode 43 and the movable electrode 45 in order to prevent short circuits resulting from contact between the electrodes.

With digital variable capacitance elements, the capacitance formed is minimized in a state where the fixed electrode 43 and the movable electrode 45 are separated (FIG. 1A). The voltage (i.e., driving voltage) between the fixed electrode 43 and the movable electrode 45 at this time is given as Voff. Also, the capacitance is maximized in a state where the fixed electrode 43 and the movable electrode 45 are in contact via the dielectric layer 49 (FIG. 1B). The driving voltage at this time is given as Von. Digital variable capacitance elements are used in these two states, that is, the state where the driving voltage is Von and the state where the driving voltage is Voff.

FIG. 1C is a graph depicting the relation between driving voltage (horizontal axis) and electrostatic capacitance (vertical axis) in a variable capacitance element. Electrostatic capacitance increases sharply at a given voltage when the driving voltage is increased, and becomes constant (maximum capacitance) thereafter, and subsequently when the driving voltage is reduced, electrostatic capacitance decreases sharply at a given voltage and then becomes constant (minimum capacitance).

Patent Document 1: Japanese Laid-open Patent Publication No. 2006-261480.

For example, in the case of manufacturing an impedance matching circuit in which a variable capacitance is connected in parallel to a signal line connecting an input terminal In and output terminal Out such as depicted in FIG. 2, the variable capacitance element is formed on a line connecting the signal line and ground. That is, a line is extracted from the signal line, and the variable capacitance element is formed on the extracted line.

In this way, the distance between the signal line and ground increases as a result of the variable capacitance element being inserted. This leads to an increase in device size.

SUMMARY

A variable capacitance element according to the present disclosure has a signal line provided on a substrate, a movable electrode provided so as to span the signal line and both ends of which are fixed with respect to the substrate, and a fixed capacitance provided at least between one of the two ends of the movable electrode and the substrate.

The object and advantages of the invention will be realized and attained by means of the elements and combinations particularly pointed out in the claims. It is to be understood that both the foregoing general description and the following detailed description are exemplary and explanatory and are not restrictive of the invention as claimed.

DESCRIPTION OF THE EMBODIMENTS

Figure 1A:
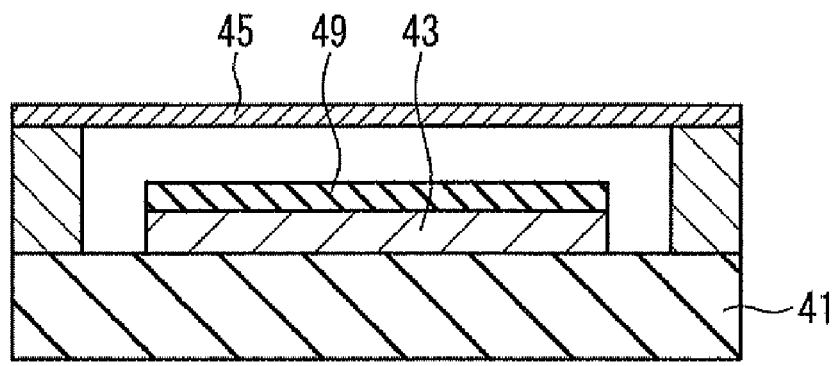
FIG. 1A depicts a configuration of a conventional variable capacitance element.
Figure 1B:
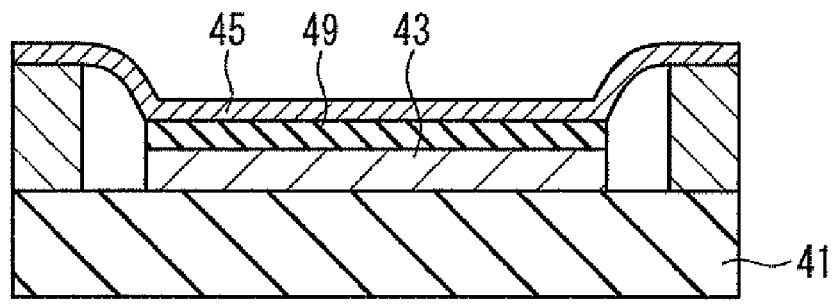
FIG. 1B depicts a configuration of a conventional variable capacitance element.
Figure 1C:
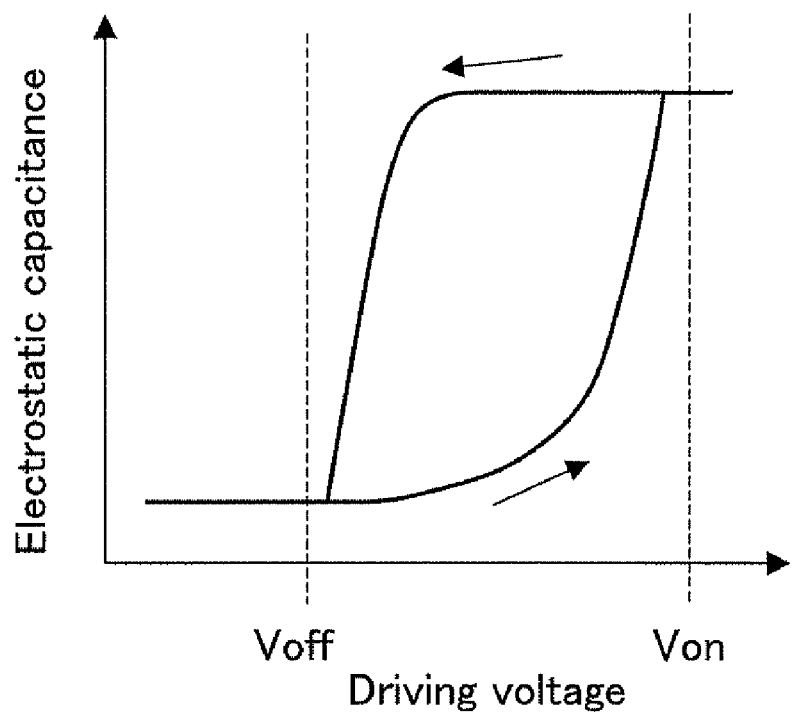
FIG. 1C is a graph depicting a relation between driving voltage and electrostatic capacitance in a variable capacitance element.
Figure 2:
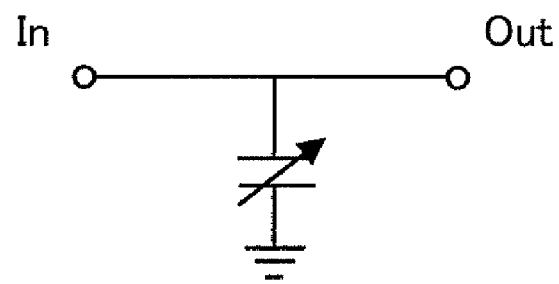
FIG. 2 is a circuit diagram depicting an example of an impedance matching circuit.
Figure 3:
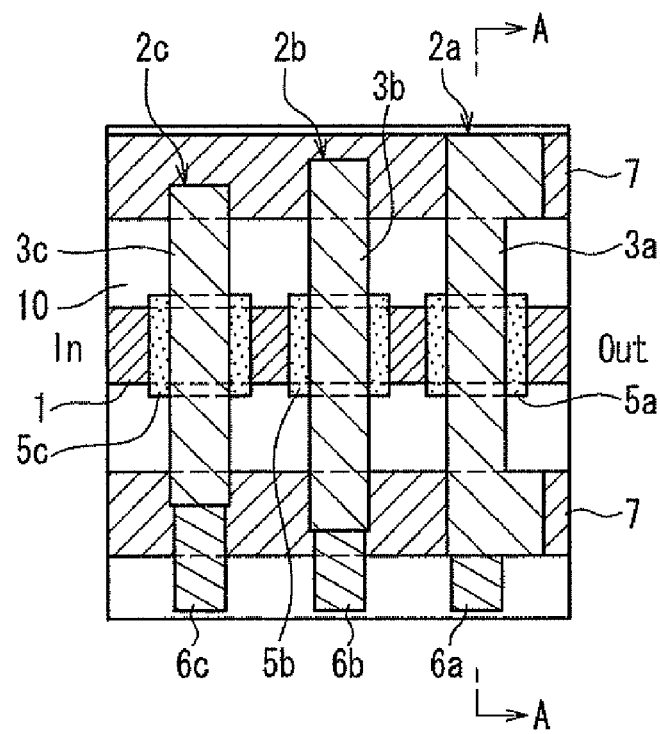
FIG. 3 is a top view of variable capacitance elements according to a first embodiment.
Figure 4:
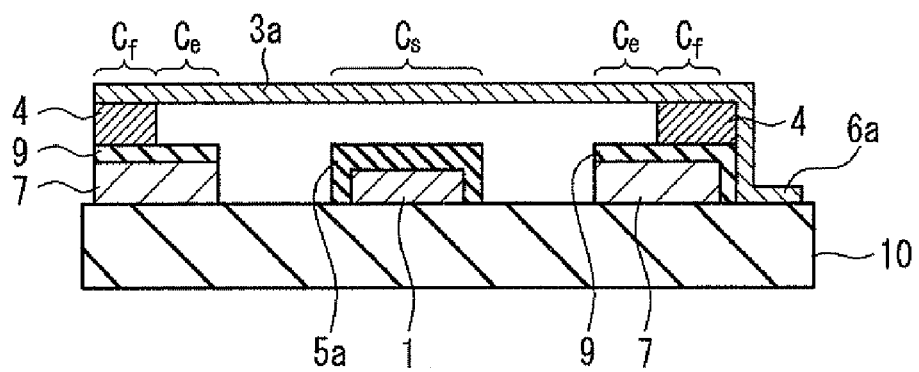
FIG. 4 is a cross-sectional view along an A-A line in FIG. 3.
Figure 5:
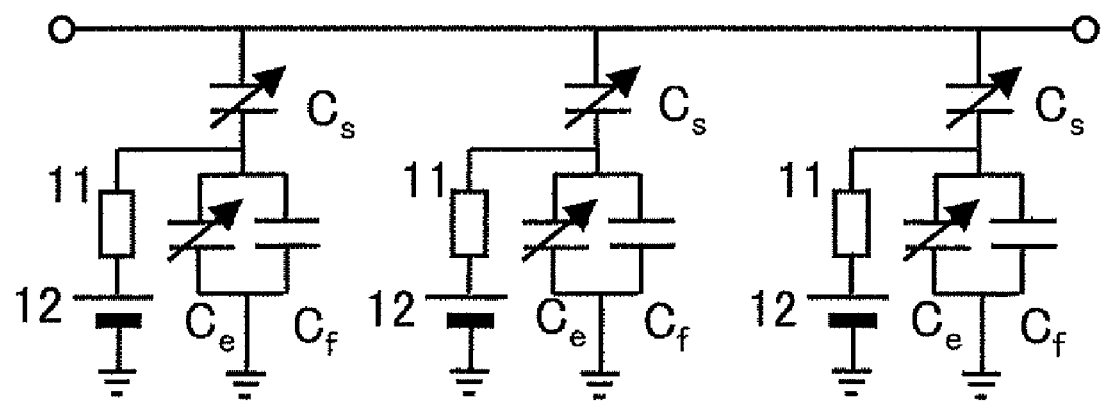
FIG. 5 is an equivalent circuit diagram of the variable capacitors depicted in FIG. 3.

Hereinafter, a first embodiment of the present invention will be described in detail with reference to the drawings.
First Embodiment
Configuration of Variable Capacitance Element FIG. 3 is a top view of variable capacitance elements according to a first embodiment, FIG. 4 is a cross-sectional view along an A-A line in FIG. 3, and FIG. 5 is an equivalent circuit diagram of the variable capacitors depicted in FIG. 3. The present embodiment is an example of the case where three variable capacitance elements 2a, 2b and 2c are connected in parallel with respect to a signal line 1.

In the example depicted in FIGS. 3 and 4, three movable electrodes 3a, 3b and 3c spanning the signal line 1 on a substrate 10 are provided. Both ends of the movable electrodes 3a, 3b and 3c are fixed with respect to ground electrodes 7 (example of fixed electrode) provided on the substrate 10. Hereinafter, the portions fixed at both ends of the movable electrodes 3a, 3b and 3c will be termed fixed portions, and the portion between the fixed portions at both ends, that is, the portion supported in the air will be termed a movable portion. A variable capacitance $C_s$ is formed by the movable portion of the movable electrodes 3a, 3b and 3c and the signal line 1. Hereinafter, this variable capacitance $C_s$ will be termed a signal line variable capacitance.

The fixed portions are fixed with respect to the ground electrodes 7 via a conductive material 4 and a dielectric layer 9. Specifically, both ends of the movable electrodes 3a, 3b and 3c are arranged above the ground electrodes 7. The dielectric layer 9 is provided on a portion of the ground electrodes 7 that overlaps with the movable electrodes 3a, 3b and 3c in a direction perpendicular to the substrate 10. The conductive material 4 is provided at both ends of the movable electrodes 3a, 3b and 3c above the dielectric layer 9 on the upper surface of the ground electrodes 7. The conductive material 4 supports both ends (fixed portions) of the movable electrodes 3a, 3b and 3c. In this way, a gap is formed between a portion of the movable electrodes 3a, 3b and 3c and the ground electrodes 7, by providing the conductive material 4 at a portion of both ends of the movable electrodes, out of the area where the ground electrodes 7 and the movable electrodes 3a, 3b and 3c overlap in a direction perpendicular to the substrate 10, and connecting the conductive material 4 to both ends of the movable electrodes.

In the above configuration, a fixed capacitance $C_f$ is formed by the fixed portions at both ends of the movable electrodes 3a, 3b and 3c and the ground electrodes 7 opposed thereto across the dielectric layer 9. Hereinafter, this fixed capacitance $C_f$ will be termed an end fixed capacitance.

As abovementioned, a gap (void) exists in a portion between the ground electrodes 7 and the movable portion of the movable electrodes 3a, 3b and 3c. That is, the movable portion of the movable electrodes 3a, 3b and 3c spans the signal line 1 and extends to above the ground electrodes 7 to connect with the fixed portions. For this reason, a variable capacitance $C_e$ is formed by the movable portion of the movable electrodes 3a, 3b and 3c and the ground electrodes 7. Hereinafter, this variable capacitance $C_e$ will be termed an end variable capacitance.

The variable capacitance elements 2a, 2b and 2c depicted in FIGS. 3 and 4 are, in other words, configured such that the movable portion of the movable electrodes 3a, 3b and 3c is arranged opposing the signal line 1 on the substrate 10, and further, an end fixed capacitance $C_f$ and an end variable capacitance $C_e$ are arranged at both ends of the movable electrodes 3a, 3b and 3c. That is, a variable capacitance element is formed by a movable electrode opposing (spanning) the signal line 1, and an end fixed capacitance and an end variable capacitance provided at both ends of the movable electrode. A plurality of these variable capacitance elements are connected in parallel with respect to the signal line 1. Dielectric layers 5a, 5b and 5c are provided at portions of the signal line 1 that oppose the movable electrodes 3a, 3b and 3c. In this way, variable capacitance elements that are efficiently arranged with respect to the signal line and tailored to a diversity of specifications are realized, by providing a plurality of variable capacitance elements so as to span the signal line.

In the example depicted in FIGS. 3 and 4, the end fixed capacitances at both ends of the movable electrode 3a have same shaped electrodes (electrodes of movable electrode 3a), and the values of the end fixed capacitances at both ends are also the same. Also, because the shapes of the upper electrodes (both ends of movable electrode 3a) of the end variable capacitances at both ends of the movable electrodes 3a are also the same, the values of end variable capacitances are the same. In this way, the occurrence of resonance can be suppressed by configuring the end fixed capacitances at both ends of the moving electrodes to have the same shape and capacitance, and also configuring the end variable capacitances at both ends to have the same shape and capacitance. As a result, use of variable capacitance elements with a wider frequency band is possible. Note that the effect of suppressing the occurrence of resonance is obtained even with a configuration having only the same shape or the same capacitance.

Also, in the present embodiment, the ground electrodes 7 with respect to which the movable electrodes 3a, 3b and 3c are fixed are provided on both sides of the signal line 1, and the movable electrodes 3a, 3b and 3c have a plane symmetric shape with respect to a plane perpendicular to the substrate and containing the signal line 1. That is, the movable electrodes have a mirror-image configuration with respect to the signal line. In this way, the occurrence of resonance can be suppressed by mirroring the arrangement of the movable electrodes with respect to the signal line.

The dielectric layer 9 provided between the fixed portions at both ends of the movable electrodes 3a, 3b and 3c and the ground electrodes 7 extends to below the movable portion of the movable electrodes 3a, 3b and 3c. Contact between the ground electrodes 7 and the movable portion of the movable electrodes 3a, 3b and 3c is thereby prevented, enabling both to be electrically separated. That is, contact between the movable portion of the movable electrodes 3a, 3b and 3c and the ground electrodes 7 (fixed electrodes) is prevented by the dielectric layer 9 that extends to below the movable portion. As a result, the reliability of the variable capacitance elements 2a, 2b and 2c increases.

Also, while not depicted, the dielectric layer 9 may be formed to extend between the ground electrodes 7 and the signal line 1. The reliability and yield of the variable capacitance elements improve because of being able to suppress the occurrence of leakage between the signal line 1 and the lower electrode (ground electrode 7) of the end fixed capacitance $C_f$.

By applying a voltage to the movable electrodes 3a, 3b and 3c with reference to the signal line 1, electrostatic attraction occurs both between the signal line 1 and the movable electrodes 3a, 3b and 3c and between the movable electrodes 3a, 3b and 3c and the ground electrodes 7. As a result, the distance between the signal line 1 and the movable electrodes 3a, 3b and 3c changes. Capacitance also changes according to this change in distance. For example, capacitance is maximized in a state where the movable electrodes 3a, 3b and 3c contact the dielectric layers 5a, 5b and 5c, and capacitance is minimized in a state where the electrostatic attraction between the movable electrodes 3a, 3b and 3c and the signal line 1 is weakest. This electrostatic attraction can be controlled by the driving voltage between the movable electrodes 3a, 3b and 3c and the signal line 1. For this reason, the capacitance of the variable capacitance elements 2a, 2b and 2c can be controlled by the driving voltage. Also, efficient driving with a lower voltage is possible because of generating electrostatic attraction both between the signal line 1 and the movable electrodes and between the ground electrodes 7 and the movable electrodes, using the driving voltage.

Bias lines 6a, 6b and 6c are provided at one end of the variable capacitance elements 2a, 2b and 2c. The movable electrodes 3a, 3b and 3c are extracted to the substrate 10 by the bias lines 6a, 6b and 6c. The dielectric layer 9 is also provided between the bias line 6a and the ground electrode 7. That is, the dielectric layer 9 is also formed on the side surface of the lower electrode (ground electrode 7) of the end fixed capacitance $C_f$. The ground electrode 7 and the bias line 6a connected to the movable electrode 3a are thereby electrically separated. An RF block 11 and a power supply 12 (although not depicted in FIGS. 3 and 4) are connected in series to the bias lines 6a, 6b and 6c of the movable electrodes 3a, 3b and 3c. This power supply 12 supplies the above driving voltage.

As depicted in the equivalent circuit diagram of FIG. 5, the power supply 12 is connected, via the RF block 11, between the signal line variable capacitance $C_s$ and the end variable capacitance $C_e$ constituted by the signal line 1 and the movable electrodes 3a, 3b and 3c. The respective capacitances act as DC blocks.

The above variable capacitance elements can be manufactured using MEMS (Micro Electro Mechanical System) technology. Also, variable capacitance elements may be called variable capacitors.

EXAMPLE OF VARIATION 1

Figure 6:
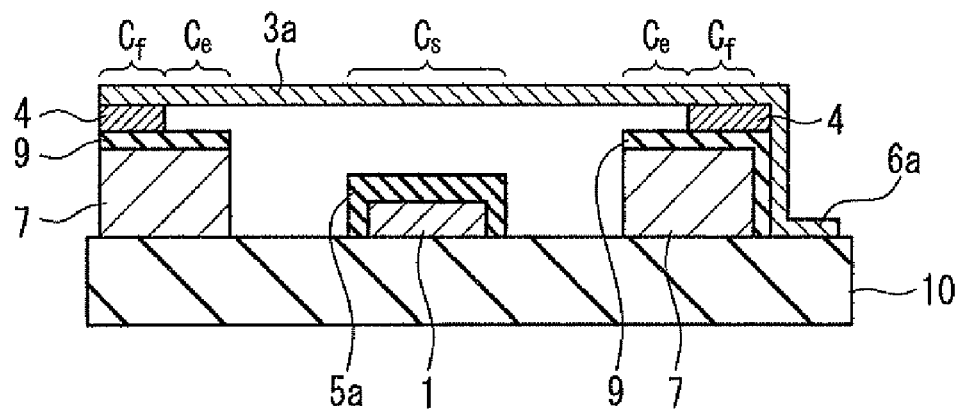
FIG. 6 depicts a variation of the cross-sectional configuration of the variable capacitance element according to the first embodiment.

FIG. 6 is a cross-sectional view depicting a variation of the variable capacitance element according to the first embodiment. In the example depicted in FIG. 6, the height of the upper surface of the ground electrodes 7 from the substrate 10 is greater than the height of the upper surface of the signal line 1 from the substrate 10. For this reason, the inter-electrode distance between the movable electrodes 3a, 3b and 3c and the ground electrodes 7 is shorter than the inter-electrode distance between the signal line 1 and the movable electrodes 3a, 3b and 3c. That is, the inter-electrode distance at the end variable capacitance $C_e$ is shorter than the inter-electrode distance at the signal line variable capacitance $C_s$. The electrostatic attraction that occurs between the electrodes at the end variable capacitance $C_e$ thereby increases, enabling driving at a lower voltage at the end variable capacitance $C_e$.

An electrostatic force F that occurs between two opposing electrodes can be represented with the following equation (1), for example.

$$F = \frac{S}{2d^2}\varepsilon V^2 \qquad (1)$$

In the above expression (1), V is the voltage, S is the area of the electrodes, $\in$ is the dielectric constant between the electrodes, and d is the distance between the electrodes. As depicted in the above expression (1), the electrostatic attraction between electrodes is dependent on the distance d between the electrodes. For this reason, the electrostatic force with respect to the driving voltage at the end variable capacitance $C_e$ can be relatively increased, by making the distance between the movable electrode 3a and the ground electrodes 7 at the end variable capacitance $C_e$ shorter than the inter-electrode distance at the signal line variable capacitance $C_s$, as depicted in FIG. 6, as an example.

In this way, the balance between the force acting on the end variable capacitance $C_e$ and the force acting on the signal line variable capacitance $C_s$ can be adjusted, by adjusting the height of the signal line 1 from the substrate 10 and the height of the ground electrodes 7 from the substrate 10.

EXAMPLE OF VARIATION 2

Figure 7:
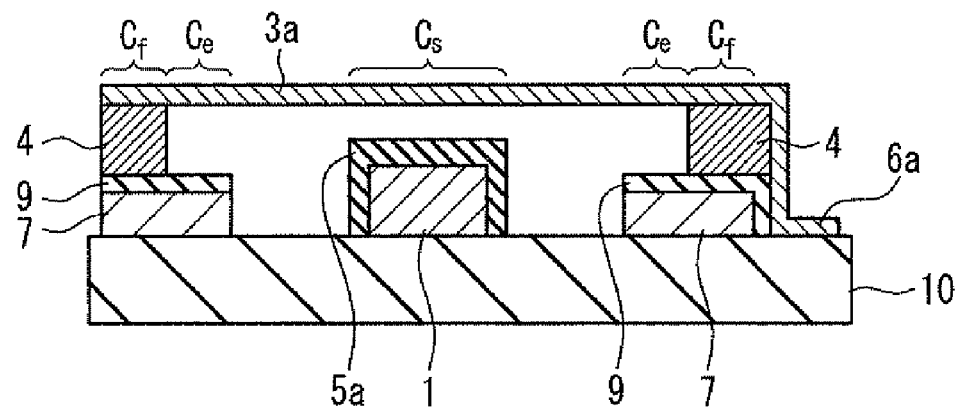
FIG. 7 is a cross-sectional view depicting another variation of the variable capacitance element according to the first embodiment.

FIG. 7 is a cross-sectional view depicting another variation of the variable capacitance element according to the present embodiment. In the example depicted in FIG. 7, the inter-electrode distance between the signal line 1 and the movable electrodes 3a, 3b and 3c is shorter than the inter-electrode distance between the movable electrodes 3a, 3b and 3c and the ground electrodes 7 at the end variable capacitance $C_e$. That is, the height of the upper surface of the ground electrodes 7 from the substrate 10 is less than the height of the upper surface of the signal line 1 from the substrate 10. The electrostatic attraction that occurs between the electrodes at the signal line variable capacitance $C_s$ thereby increases, enabling driving at a lower voltage at the signal line variable capacitance $C_s$. Also, the movable electrodes 3a, 3b and 3c can be brought into contact with the dielectric layers 5a, 5b and 5c, even at a lower driving voltage, as a result of the signal line 1 and the movable electrodes drawing closer together. The structure depicted in FIG. 7 is suitable for the case where, for example, driving efficiency at the signal line variable capacitance $C_s$ is prioritized.

Description of Effects, and Other Matters

Figure 8:
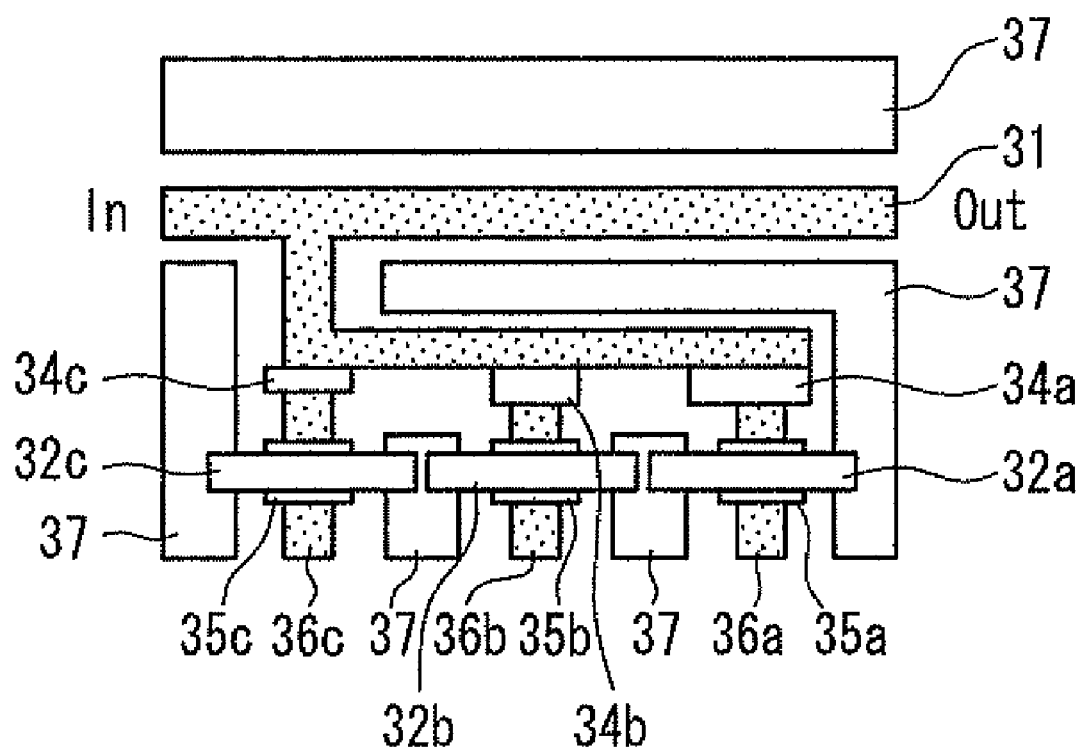
FIG. 8 is a top view of comparative variable capacitance elements.
Figure 9:
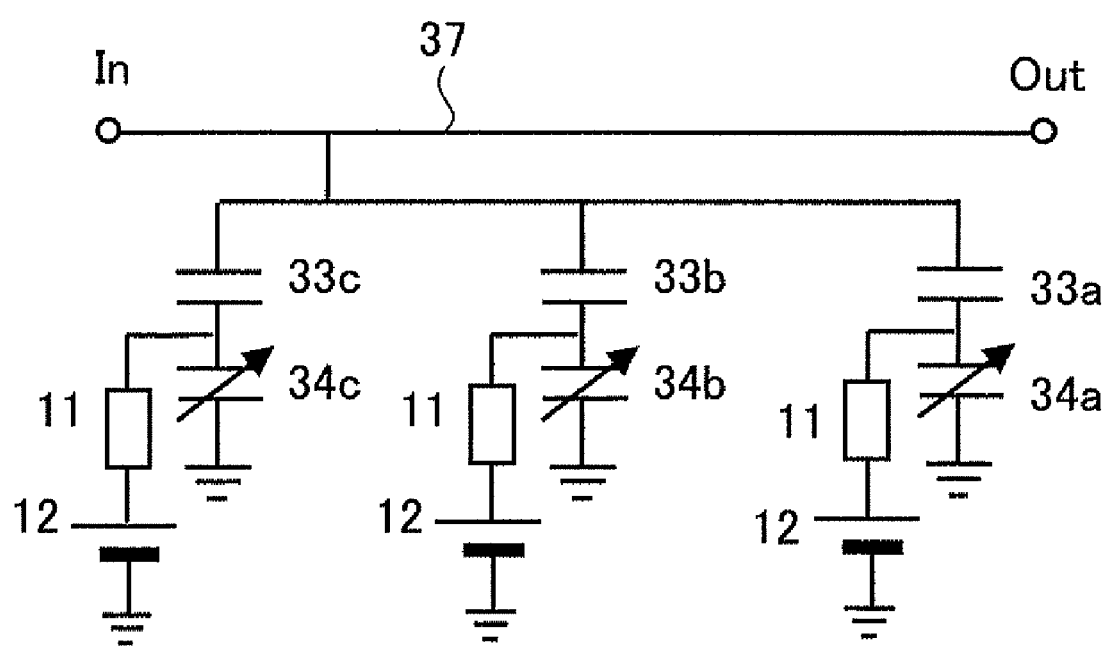
FIG. 9 is an equivalent circuit diagram of the variable capacitance elements depicted in FIG. 8.

FIG. 8 is a top view of comparative variable capacitance elements. FIG. 9 is an equivalent circuit diagram of the variable capacitance elements depicted in FIG. 8. In the example depicted in FIG. 8, movable electrodes 32a, 32b and 32c are provided in positions spanning lines connected to a signal line 31 via fixed capacitances 34. Both ends of the movable electrodes 32a, 32b and 32c are connected to ground electrodes 37. A power supply 12 is connected to fixed electrodes 36a, 36b and 36c, which form one end of the lines spanned by these movable electrodes 32a, 32b and 32c, via an RF block 11 (see FIG. 9). Three variable capacitance elements are thus formed by the movable electrodes 32a, 32b and 32c.

When compared with the configuration depicted in FIG. 3, the distance from the signal line 31 to the variable capacitance elements increases with the configuration depicted in FIG. 8. This leads to higher parasitic LCR, deterioration in the characteristics of the impedance matching circuits, and an increase in device size. In contrast, because the movable electrodes 3a, 3b and 3c depicted in FIG. 3 are provided so as to span the signal line 1 connecting the input terminal In and the output terminal Out, the distance from the signal line 1 to the variable capacitance elements is small. As a result, parasitic LCR can be lowered, enabling further element miniaturization.

Second Embodiment

Figure 10:
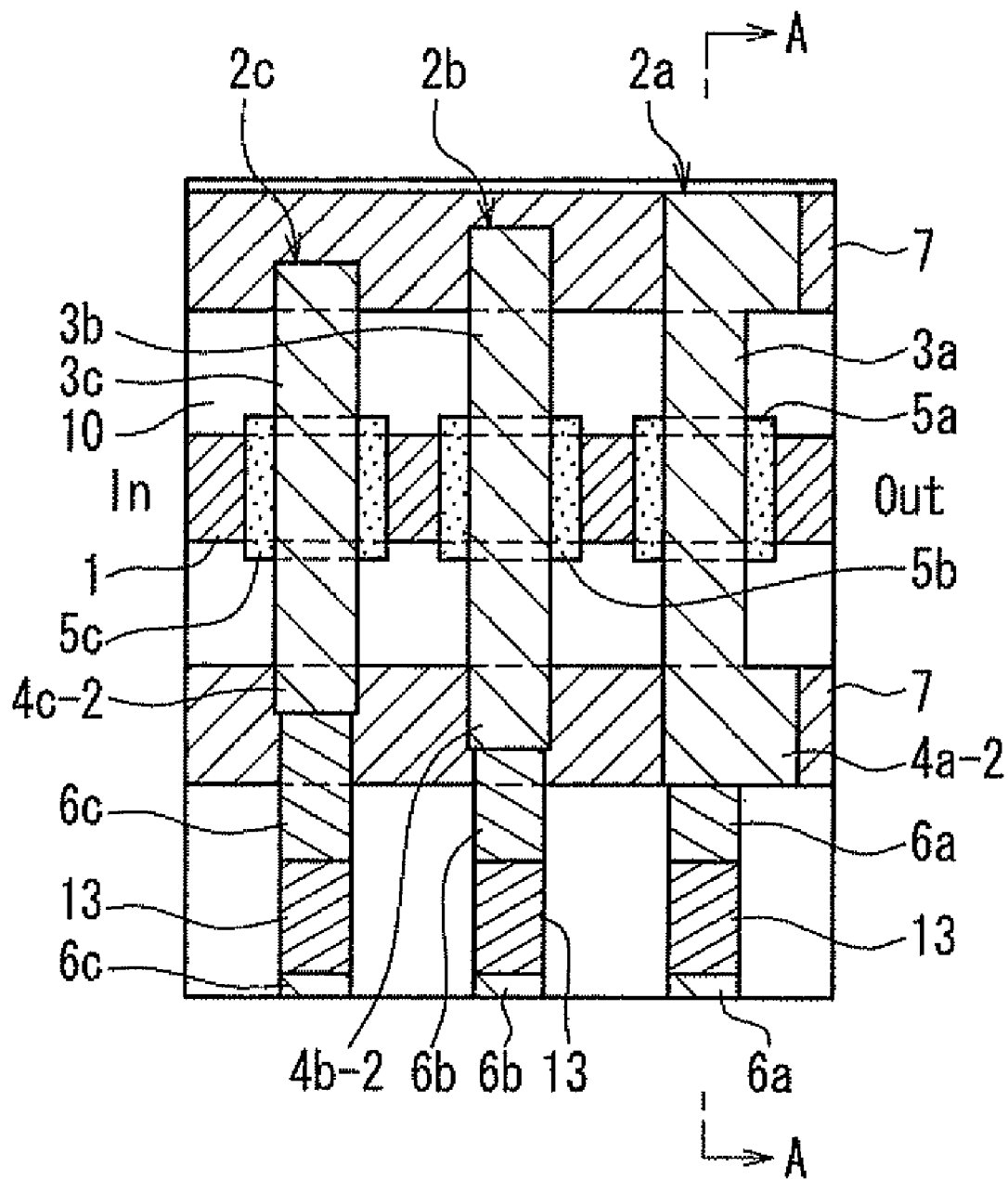
FIG. 10 is a plan view of variable capacitance elements according to a second embodiment.
Figure 11A:
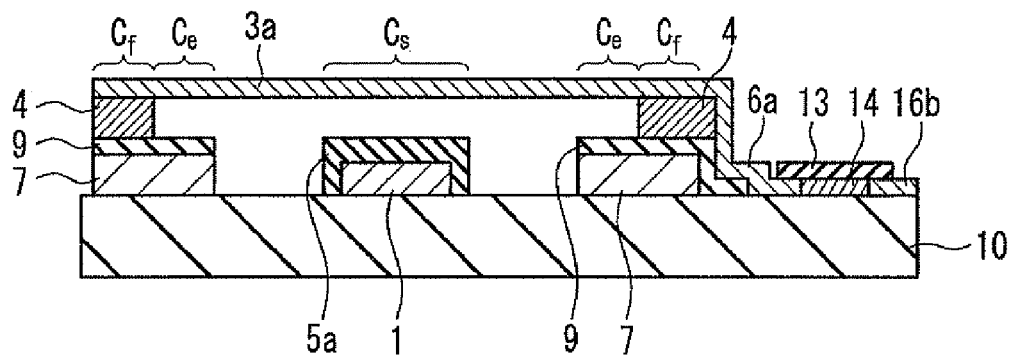
FIG. 11A is a cross-sectional view along an A-A line in FIG. 10.
Figure 11B:
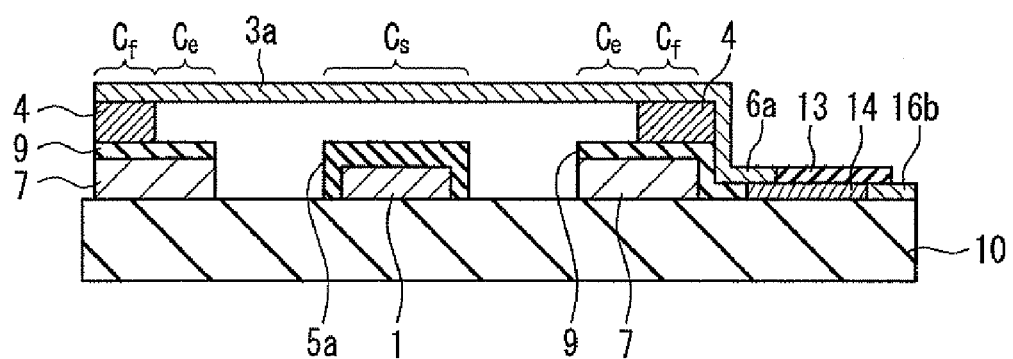
FIG. 11B depicts a variation of the cross-sectional configuration along the A-A line in FIG. 10.

FIG. 10 is a plan view of variable capacitance elements according to a second embodiment. FIG. 11A is a cross-sectional view along an A-A line in FIG. 10. FIG. 11B depicts a variation of the cross-sectional configuration along the A-A line in FIG. 10. In FIGS. 10, 11A and 11B, members that are the same as FIGS. 3 and 4 are given the same numbers.

In the example depicted in FIG. 10 and FIG. 11A or 11B, an RF block 11 is mounted on a substrate 10 on which a signal line 1 is provided. The RF block 11 is connected to a bias line 6a that extracts a movable electrode 3a onto the substrate 10. The RF block 11 is, for example, formed by a SiCr film 14 (example of resistance film) provided on the substrate 10. This SiCr film 14 is connected to the bias line 6a. The SiCr film 14 is covered by a protective film 13. The protective film 13 can, for example, be formed with an insulating film such as $SiO_2$, SiNx or alumina.

In the example depicted in FIG. 11A, a dielectric layer 9 is formed on the upper surface of a ground electrode 7 and on the side surface thereof on the opposite side to the signal line 1, and is in contact with the substrate 10. The bias line 6a connected to the end of the movable electrode 3a reaches the substrate 10 via the dielectric layer 9 provided on the side surface of the ground electrode 7. The SiCr film 14 forming the RF block 11 is connected to the bias line 6a reaching the substrate. A wiring 16b is connected to the opposite side of the SiCr film 14 to the dielectric layer 9. The protective film 13 is formed so as to cover the entire upper surface of the SiCr film 14. The SiCr film 14 is thereby protected by the substrate 10, the bias line 6a, the protective film 13 and the wiring 16b.

In the example depicted in FIG. 11B, the dielectric layer 9 is formed on the upper surface of the ground electrode 7 and on the side surface thereof on the opposite side to the signal line 1, and is in contact with the substrate 10. The SiCr film 14 forming the RF block 11 is connected to the portion of the dielectric layer 9 in contact with the substrate 10. The bias line 6a extends from the end of the movable electrode 3a to the upper surface of the SiCr film 14. The protective film 13 is formed on the portion of the upper surface of the SiCr film 14 that is not covered by the bias electrode 6a. The SiCr film 14 is thereby protected by the substrate 10, the dielectric layer 9, the bias line 6a, the protective film 13, and the wiring 16b.

Sacrificial layer etching is often used in the space formation between the signal line 1 and the movable electrode 3a. Stable characteristics are obtained by forming the protective film 13 on the upper surface, since the SiCr film 14 is easily damaged when removing this sacrificial layer.

Note that the film forming the RF block 11 is not limited to SiCr, and other resistance films can be used. In terms of the resistance layer, ZnO, W, Si, Fe—Cr—Al alloy, Ni—Cr alloy, Ni—Cr—Fe alloy or the like is used, for example. In this way, the RF block can be mounted on the substrate 10, by constituting a portion of the bias line 6a on the substrate 10 as a resistance film. It is thereby no longer necessary to provide separate chip components for the RF blocks. Also, the length of the lines to the power supply can be shortened by mounting the RF blocks on the substrate 10. For this reason, deterioration of characteristics due to the length of the lines is prevented.

As abovementioned, in the present embodiment, the variable capacitance element is provided with a bias line 6a that extracts the movable electrode 3a to the substrate 10, and a resistance film is inserted with respect to the bias line 6a, and covered with a protective film. According to this configuration, elements formed using a resistance film, such as RF blocks and the like, can be mounted on a substrate, for example.

Third Embodiment

Figure 12:
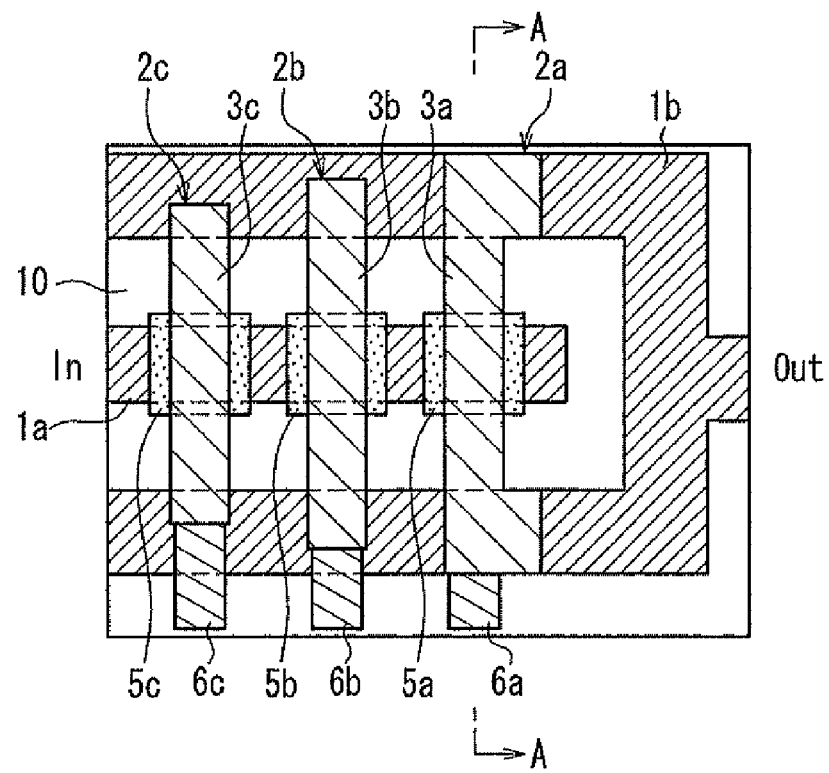
FIG. 12 is a plan view of variable capacitance elements according to a third embodiment.
Figure 13:
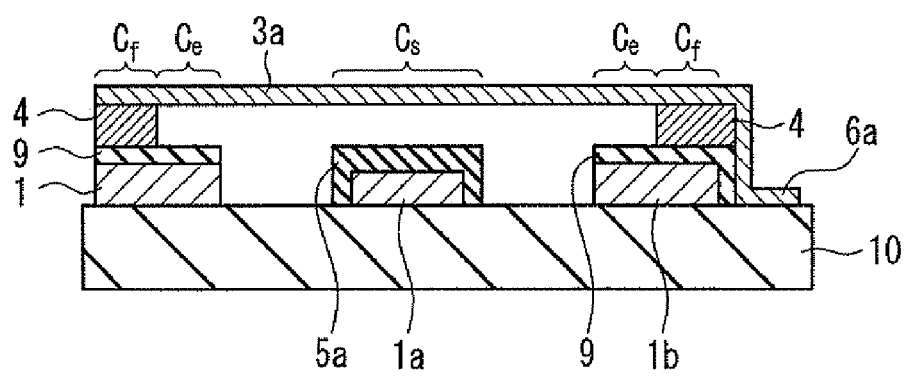
FIG. 13 is a cross-sectional view along an A-A line in FIG. 12.
Figure 14:
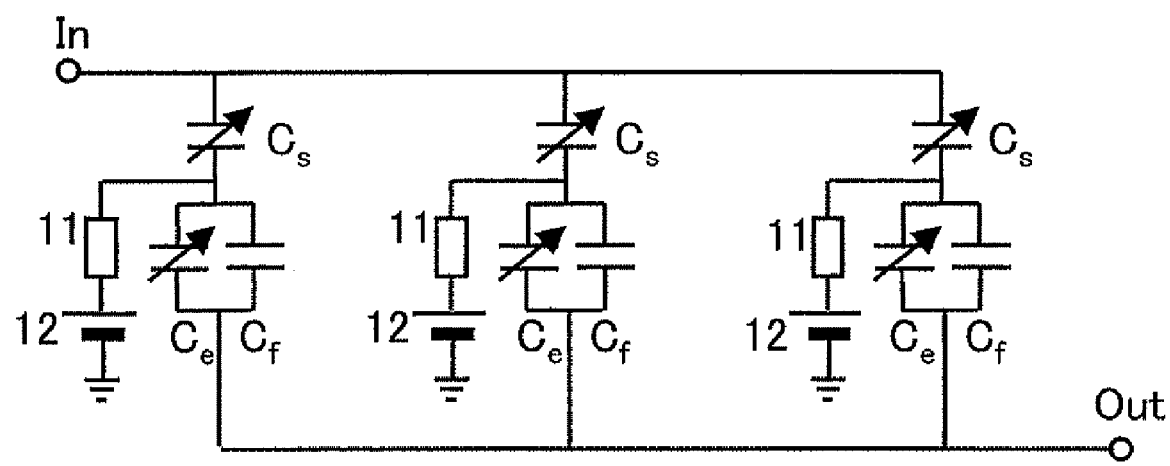
FIG. 14 is an equivalent circuit diagram of the variable capacitance elements depicted in FIG. 12.

FIG. 12 is a plan view of variable capacitance elements according to a third embodiment. FIG. 13 is a cross-sectional view along an A-A line in FIG. 12. FIG. 14 is an equivalent circuit diagram of the variable capacitance elements depicted in FIG. 12. In FIGS. 12 to 14, members that are the same as FIGS. 3 to 5 are given the same numbers.

In FIG. 3, a plurality of variable capacitance elements 2a, 2b and 2c are connected in parallel with respect to the signal line 1. In contrast, in FIG. 12, variable capacitance elements 2a, 2b and 2c are connected in series with respect to signal lines 1. In this way, variable capacitance elements can also be formed in series with respect to a signal line.

In the example depicted in FIGS. 12 and 13, fixed electrodes at an end fixed capacitance $C_f$ provided at both ends of movable electrodes 3a, 3b and 3c spanning a signal line 1a on the input terminal In side are connected to a signal line 1b on the output terminal Out side. These three variable capacitance elements 2a, 2b and 2c can thereby be connected in series with respect to the signal lines 1. That is, both ends of the three movable electrodes 3a, 3b and 3c spanning the signal line 1a on the input terminal In side are fixed with respect to the signal line 1b (example of fixed electrode) on the output terminal Out side provided on the substrate 10.

The movable electrodes 3a, 3b and 3c are arranged so that both ends thereof extend to above the signal line 1b. A dielectric layer 9 is provided over the entire upper surface of the signal line 1b. A conductive material 4 is provided at both ends of the movable electrodes 3a, 3b and 3c above the dielectric layer 9 on the upper surface of the signal line 1b. The conductive material 4 supports both ends (fixed portions) of the movable electrodes 3a, 3b and 3c. In this way, a gap is formed between a portion of the movable electrodes 3a, 3b and 3c and the signal line 1b, by providing the conductive material 4 at a portion of both ends of the movable electrodes above the signal line 1b, and fixing the conductive material 4 in connection with both ends of the movable electrodes.

The movable electrodes 3a, 3b and 3c are arranged so that both ends thereof extend to above the signal line 1b. A dielectric layer 9 is provided on a portion of the signal line 1b that overlaps with the movable electrodes 3a, 3b and 3c in a direction perpendicular to the substrate 10. The conductive material 4 is provided at both ends of the movable electrodes 3a, 3b and 3c above the dielectric layer 9 on the upper surface of the signal line 1b. The conductive material 4 supports both ends (fixed portions) of the movable electrodes 3a, 3b and 3c. A gap is thereby formed between a portion of the movable electrodes 3a, 3b and 3c and the signal line 1b.

The variable capacitance elements 2a, 2b and 2c depicted in FIGS. 12 and 13 are, in other words, constituted such that the movable portion of the movable electrodes 3a, 3b and 3c is arranged opposing the signal line 1a on the input terminal In side, and, further, an end fixed capacitance $C_f$ and an end variable capacitance $C_e$ are arranged at both ends of the movable electrodes 3a, 3b and 3c. The end fixed capacitance $C_f$ and the end variable capacitance $C_e$ are formed with the movable electrodes 3a, 3b and 3c as upper electrodes, and the signal line 1b on the output terminal Out side as a lower electrode. Dielectric layers 5a, 5b and 5c are provided on a portion of the signal line 1a opposing the movable electrodes 3a, 3b and 3c.

As depicted in the equivalent circuit diagram of FIG. 14, a power supply 12 for driving the variable capacitance elements 2a, 2b and 2c is connected between the signal line variable capacitance $C_s$ and the end variable capacitance $C_e$ via an RF block 11.

In this way, variable capacitance elements that are efficiently arranged in series with respect to signal lines and are tailored to a diversity of specifications are realized, by arranging the movable electrodes so as to span the signal line on the input side, and fixing both ends of the movable electrodes with respect to the signal line on the output side via a dielectric layer. Note that the signal line spanned by the movable electrodes may be the signal line on the output side, and the fixed electrodes fixing both ends of the movable electrodes may be the signal line on the input side.

Fourth Embodiment

Figure 15:
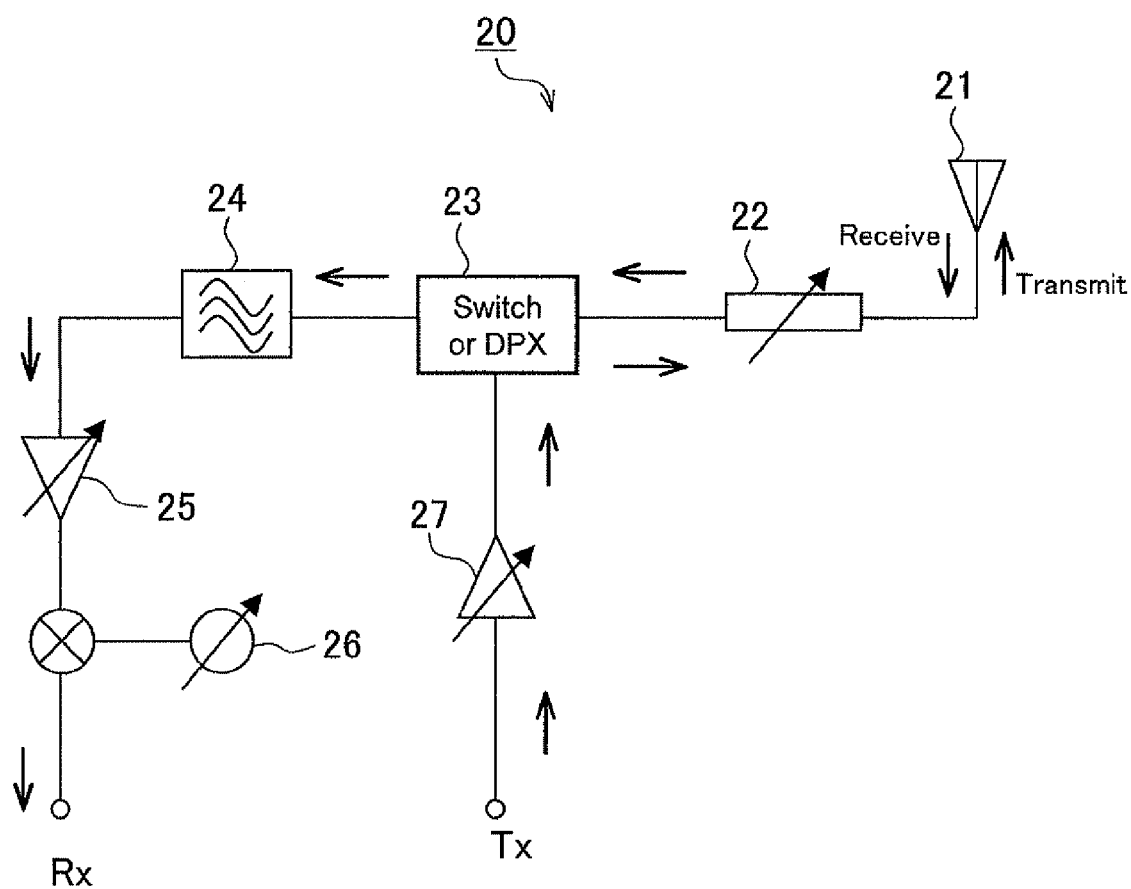
FIG. 15 is a circuit diagram depicting an example configuration of a communication module using variable capacitance elements.

The present embodiment is an example module using the variable capacitance elements of any of the above first to third embodiments. FIG. 15 is a circuit diagram depicting an example configuration of a communication module using variable capacitance elements. A communication module 20 depicted in FIG. 15 is a module of an RF front end of a communication device. This communication module 20 is able to adjust the frequency band of reception signals and transmission signals. Note that the arrows in FIG. 15 indicate the flow direction of signals.

The communication module 20 depicted in FIG. 15 is provided with a tunable antenna 21, an impedance tuner (matcher) 22, a switch (or DPX) 23, a tunable filter 24, a tunable LNA 25, a tunable VCO 26, and a tunable PA 27.

The tunable antenna 21 is an antenna, the direction of directivity of which can be freely adjusted. The impedance tuner 22 is connected between the tunable antenna 21 and the switch 23. The impedance tuner 22 is optimized by adjusting impedance according to the state around the antenna. The switch 23 divides the line from the tunable antenna 21 into a line on the transmission terminal Tx side and a line on the reception terminal Rx side.

The tunable filter 24, the pass frequency band of which is adjustable, the tunable LNA 25 and the tunable VCO 26 are connected to the line between the switch 23 and the reception terminal Rx side. The tunable LNA 25 is a low-noise amplifier, the efficiency, power and frequency of which are adjustable. The tunable VCO 26 is an oscillator, the frequency of which is adjustable.

The tunable PA 27 is connected between the switch 23 and the transmission terminal Tx side. The tunable PA 27 is a power amplifier, the efficiency, power and frequency of which are adjustable.

The variable capacitance elements of any of the above first to third embodiments are mounted in the tunable antenna 21, the impedance tuner 22, the tunable filter 24, the tunable LNA 25, the tunable VCO 26 and the tunable PA 27, out of the above constituent elements. Thereby, because variable capacitance elements that are able to lower parasitic LCR and have been further miniaturized are used, characteristics are further improved, and a more compact communication module is provided.

Figure 16A:
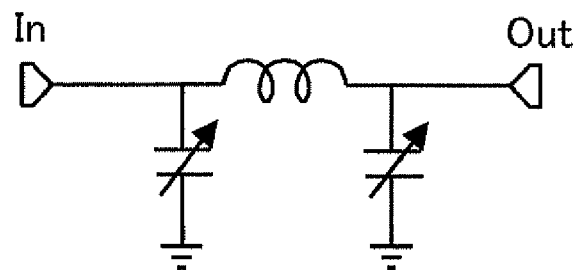
FIG. 16A depicts an example circuit configuration of an impedance tuner.
Figure 16B:
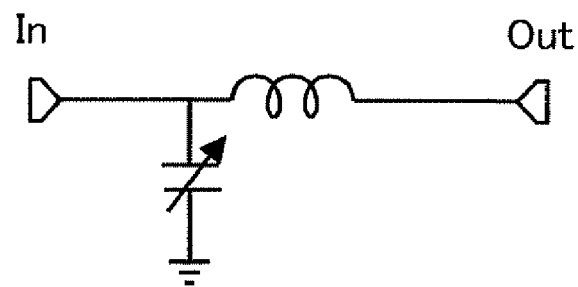
FIG. 16B depicts an example circuit configuration of an impedance tuner.
Figure 16C:
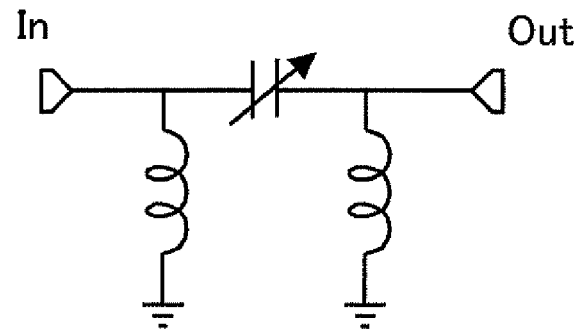
FIG. 16C depicts an example circuit configuration of an impedance tuner.
Figure 16D:
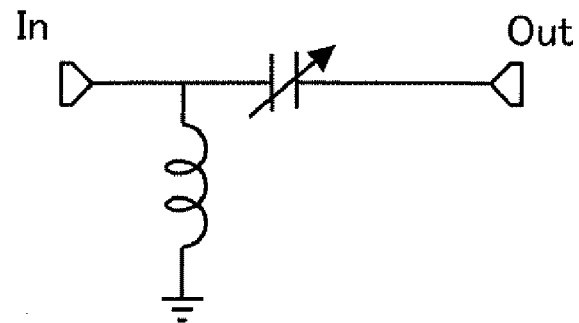
FIG. 16D depicts an example circuit configuration of an impedance tuner.

FIGS. 16A to 16D depict example circuit configurations of the impedance tuner 22. The impedance tuner depicted in FIG. 16A includes an inductor connected in series, and two variable capacitors connected in parallel, with respect to a signal line connecting the input terminal In and the output terminal Out. In FIG. 16B, a single inductor is connected in series, and a single variable capacitor is connected in parallel, with respect to the signal line. In FIG. 16C, a single variable capacitor is connected in series, and two inductors are connected in parallel, with respect to the signal line. In FIG. 16D, a single variable capacitor is connected in series, and a single inductor is connected in parallel, with respect to the signal line. The variable capacitance elements of any of the above first to third embodiments are used for the variable capacitors in FIGS. 16A to 16D.

For example, one of the variable capacitors connected in parallel depicted in the circuit diagram of FIG. 16A or 16B can be formed with three variable capacitance elements that span the signal line, as depicted in FIG. 3, for example. The variable capacitor connected in series depicted in FIG. 16C or 16D can be formed with three variable capacitance elements such as depicted in FIG. 12, for example. Note that the number of variable capacitance elements is not limited to three.

A module using variable capacitance elements is not limited to the communication module depicted in FIG. 15. Modules that include at least one of the constituent elements included in the communication module depicted in FIG. 15, or, further, modules to which constituent elements have been added are encompassed in the embodiments of the present invention.

Figure 17:
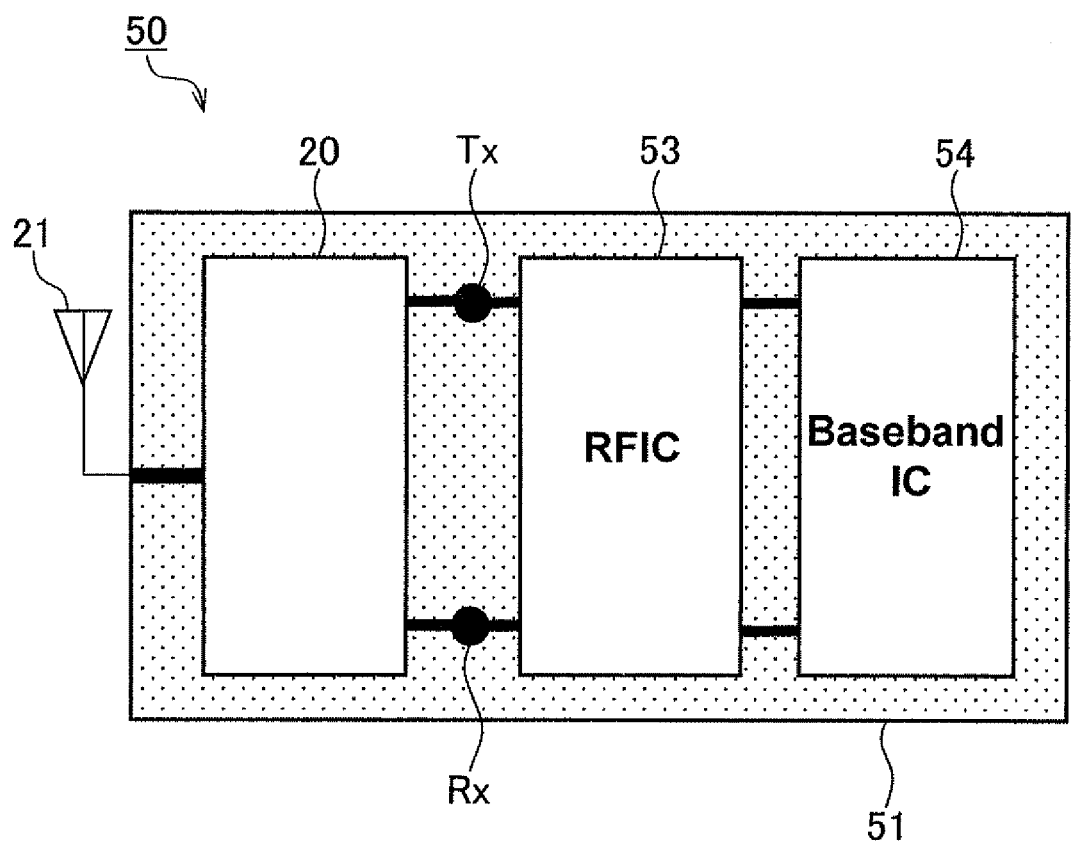
FIG. 17 depicts an example configuration of a communication device.

For example, a communication device that includes the communication module 20 depicted in FIG. 15 is also encompassed in the embodiments of the present invention. FIG. 17 depicts an example configuration of a communication device. With a communication device 50 depicted in FIG. 17, the communication module 20 of the front end depicted in FIG. 15, an RFIC 53 and a baseband IC 54 are provided on a module substrate 51.

The transmission terminal Tx of the communication module 20 is connected to the RFIC 53, and the reception terminal Rx is also connected to the RFIC 53. The RFIC 53 is connected to the baseband IC 54. The RFIC 53 can be formed by semiconductor chips and other components. The RFIC 53 has integrated therein circuits including a reception circuit for processing reception signals input from the reception terminal, and a transmission circuit for processing transmission signals.

The baseband IC 54 can also be realized by semiconductor chips and other components. The baseband IC 54 has integrated therein a circuit for converting reception signals received from the reception circuit included in the RFIC 53 to audio signals or packet data, and a circuit for converting audio signals or packet data to transmission signals, and outputting the transmission signals to the transmission circuit included in the RFIC 53.

While not depicted, an output device such as a speaker or a display, for example, is connected to the baseband IC 54, and the output device is able to output audio signals or packet data converted from reception signals by the baseband IC 54, and allow the user of the communication device 50 to perceive the audio signals or packet data. An input device, such as a microphone, a button or the like, provided in the communication device 50 is also connected to the baseband IC 54, and the baseband IC 54 is able to convert audio and data input by the user to transmission signals. Note that the configuration of the communication device 50 is not limited to the example depicted in FIG. 17.

Stand-alone elements such as the tunable antenna 21, the impedance tuner 22, the tunable filter 24, the tunable LNA 25, and the tunable oscillator 26 depicted in FIG. 15 are also encompassed in the embodiments of the present invention. Further, the variable capacitance elements of the first to third embodiments can also be used in elements other than the above.

The above first to fourth embodiments are exemplary embodiments of the present invention, and the embodiments of the present invention are not limited to the above examples. For example, in the above embodiments, an example was described in which fixed capacitances are provided at both ends of the movable electrodes, but even with a configuration in which a fixed capacitance is provided at only one of the two ends of the movable electrodes, the effect of enabling miniaturization can be obtained. Also, the number of variable capacitance elements does not necessarily have to be three.

Effects of the Embodiments, and Other Matters

In the above embodiments, movable electrodes include a movable portion that spans a signal line and extends to above a fixed electrode, and a fixed portion that is fixed to the fixed electrode across a dielectric layer. Movable electrodes can thereby be arranged in positions opposing the signal line. The distance between the signal line and the variable capacitance elements is shortened, enabling device miniaturization. Because the movable portion extends to above the fixed electrode, a configuration that enables an electrostatic force to also be generated between the movable electrodes and the fixed electrodes is realized. For this reason, the variable capacitance elements can be efficiently driven.

Also, as described in the above embodiments, a mode in which a gap exists between the fixed electrodes and the variable portion at least above a portion of the fixed electrodes can be configured. In this way, a gap for at least enabling the movable portions to move can be provided above the fixed electrodes.

Modules provided with the above variable capacitance elements, and communication devices provided with such modules are encompassed in the embodiments of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

The invention claimed is:

1. A variable capacitance element comprising:
    a substrate;
    a signal line provided on the substrate;
    a fixed electrode provided on the substrate; and
    a movable electrode including a movable portion that spans the signal line and extends to above the fixed electrode, and is movable with respect to the fixed electrode, and a fixed portion that is fixed to the fixed electrode across a dielectric layer,
    wherein the fixed portion is configured at both ends of the movable electrode and values of the capacitances formed by the fixed electrode and the fixed portion at the both ends are the same.

2. The variable capacitance element according to claim 1, wherein a gap exists between the fixed electrode and the movable portion in at least a portion above the fixed electrode.

3. The variable capacitance element according to claim 1, wherein a distance from a surface of the substrate to an upper surface of the fixed electrode is less than a distance from the surface of the substrate to an upper surface of the signal line.

4. The variable capacitance element according to claim 1, wherein a distance from a surface of the substrate to an upper surface of the signal line is less than a distance from the surface of the substrate to an upper surface of the fixed electrode.

5. The variable capacitance element according to claim 1, wherein the dielectric layer extends to below the movable portion.

6. The variable capacitance element according to claim 1, wherein the fixed electrode is provided on both sides of the signal line, and
    the movable electrode is plane symmetric with respect to a plane perpendicular to the substrate and containing the signal line.

7. The variable capacitance element according to claim 1, wherein the fixed electrode is a ground line.

8. The variable capacitance element according to claim 1, comprising:
    an extraction line that extracts the movable electrode onto the substrate,
    wherein the extraction line is insulated from the fixed electrode by the dielectric layer.

9. The variable capacitance element according to claim 1, comprising:
    a bias line that extracts the movable electrode to the substrate,
    wherein a resistance film is inserted with respect to the bias line, and the resistance film is covered with a protective film.

10. A communication device comprising the variable capacitance element according to claim 1.

* * * * *